March 10, 1964 J. A. FITZMAURICE 3,124,636

CHARACTER RECOGNITION DEVICES

Filed April 29, 1960 3 Sheets-Sheet 1

INVENTOR

John A. Fitzmaurice

BY Morse & Altman

ATTORNEYS

INVENTOR
John A. Fitzmaurice
BY Morse & Altman
ATTORNEYS

March 10, 1964 J. A. FITZMAURICE 3,124,636

CHARACTER RECOGNITION DEVICES

Filed April 29, 1960 3 Sheets-Sheet 3

INVENTOR
John A. Fitzmaurice
BY Morse & Altman
ATTORNEYS

United States Patent Office 3,124,636

Patented Mar. 10, 1964

3,124,636

CHARACTER RECOGNITION DEVICES

John A. Fitzmaurice, Arlington, Mass., assignor to Baird-Atomic, Inc., Cambridge, Mass., a corporation of Massachusetts Filed Apr. 29, 1960, Ser. No. 25,659

3 Claims. (Cl. 88—1)

The present invention relates to character recognition and, more particularly, to devices for automatically recognizing intelligence symbols such as alpha-numeric characters. The word "recognize" is used herein to signify the transformation of ordinary spacial representations, i.e. letters, numerals, words, etc., into corresponding signals that can be utilized by machines.

The object of the present invention is to provide a novel electro-optical device for automatically identifying an unknown visual representation for translation into usable electric signals by simultaneously comparing the unknown representation with reference representations of an array and determining with which particular one of the reference representations the unknown representation has a predetermined spacial correlation. More specifically, the contemplated device comprises a lens system and, in relation thereto, a holder for positioning an unknown representation to be identified, an array of reference representations for comparison therewith and an array of photodetectors for producing signals for selective acceptance. The holder and the array of reference representations are positioned at the object plane and the center plane of the lens system, respectively or vice versa. The array of photodetectors is positioned at a point predeterminedly spaced from the image plane of the lens system in a novel manner.

Other objects of the present invention will in part be obvious and will in part appear hereinafter.

The invention accordingly comprises the device possessing the construction, combination of elements and arrangement of parts, which are exemplified in the following detailed disclosure the scope of which will be indicated in the appended claims.

For a fuller understanding of the nature and objects of the present invention, reference should be had to the following detailed description taken in connection with the accompanying drawings wherein.

Figure 1:
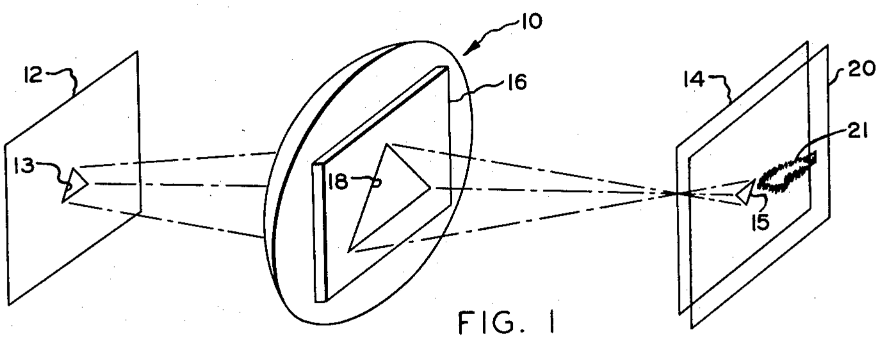
FIGS. 1, 2, 3 and 4 are diagrams illustrating the principles of the present invention.

*General Description—FIG. 1*

Generally, FIG. 1 shows an optical system 10 presenting a pair of conjugate object and image planes 12 and 14 and center plane 16 having a stop 18. Thus an object 13 at plane 12 produces an image 15 at plane 14. Image 15 may or may not be inverted depending on the particular choice of optical system 10. The intensity of the light flux generating the image in plane 14 is identical to the intensity of the light flux from the object in plane 12 except for an attenuation that is a function of the size of stop 18. In an out-of-focus plane 20 that is somewhat displaced from image plane 14, the image 21 is somewhat blurred. The intensity distribution in out-of-focus plane 20 may be described approximately as a neighborhood averaging of intensities of light flux from the object. The shape of the neighborhood is determined by the shape of stop 18. The area of the neighborhood is determined by this shape and by the distance which out-of-focus plane 20 is displaced from image plane 14. If stop 18 has a non-uniform transmittance, the neighborhood averaging of intensities will be weighted in accordance with this transmittance of stop 18 at the corresponding point and inversely proportional to the area of the neighborhood of object plane 12 throughout which the averaging takes place. (Thus when the image is in focus, it is equal in light flux intensity to the object except for uniform attenuation and magnification.) If stop 18 has the same shape as the object being imaged and if the degree of defocusing is such that the averaging neighborhood is of the same size as the object, the image will be an autoconvolution of the object brightness, except for uniform attenuation and magnification. If each of the object and the stop is a light figure on a dark background, then with the proper amount of defocusing, as will be discussed more fully below, the image will have a bright point of peak intensity at its center. If a different object is substituted under the same conditions, i.e. same degree of defocusing and stop of the same size and shape as before, the peak intensity often will be lower than the aforementioned peak intensity but never will be greater. A comparison of peak intensities or the pre-selection of an intensity threshold will indicate which of the reference representations most closely conforms to the object and, theerfore, the identity of the object.

Figure 2:
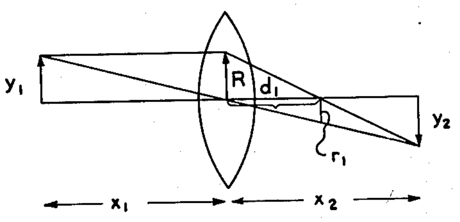
Figure 3:
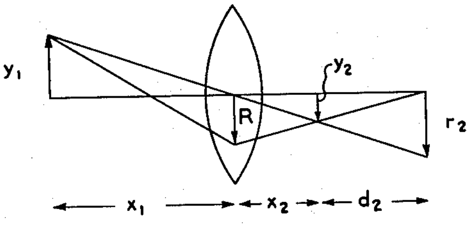
Figure 4:
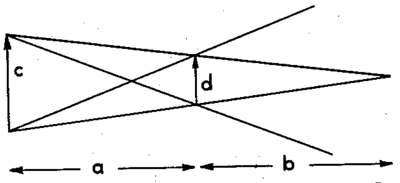

Three arrangements of the optical components of a system embodying the present invention are illustrated in FIGS. 2, 3 and 4. FIG. 2 illustrates a refractive system in which the unknown representation is imaged by light transmitted through a lens and the critically defocused image is disposed between the lens and the in-focus image. FIG. 3 illustrates a refractive system in which the known representation is imaged by light transmitted through a lens and the infocus image is disposed between the lens and the critically defocused image. And FIG. 4 illustrates a system in which no lens is used. In accordance with convention, the systems illustrated in FIGS. 2 and 3 will be characterized in terms of any plane containing the optic axis and in terms of parts of the object and the image on opposite sides of the optic axis. Although FIGS. 2, 3 and 4 show only single reference representation it is to be understood, as will be later illustrated, that a complete set of reference representations are used simultaneously.

*The Optical System of FIG. 2*

The optical system shown in FIG. 2 may be described by the following equations:

$$\left.\begin{aligned} &\frac{1}{x_1}+\frac{1}{x_2}=\frac{1}{f} \\ &\frac{x_1}{x_2}=\frac{y_1}{y_2} \\ &\frac{R}{d_1}=\frac{y_2}{x_2-d_1} \\ &\frac{r_1}{d_1}=\frac{y_1}{x_1} \end{aligned}\right\}\text{Equations I}$$

where:

$y_1$ is the perpendicular distance from the optic axis to the object point farthest from the optic axis;

$y_2$ is the corresponding image size;

$x_1$ is the distance from the object to the lens center as measured along the optic axis;

$x_2$ is the distance from the lens center to the in-focus image plane as measured along the optic axis;

$f$ is the focal length of the lens;

R is the effective radius of the lens (the radius of the stop in the lens plane);

$d_1$ is the distance measured along the optic axis from the lens center to the point where a ray, coming from the top of the object and passing through the lens at a distance R from the optic axis, intersects the optic axis (the image in a plane normal to the optic axis at this point will be called the "critically defocused image"); and $r_1$ is the distance measured in the plane of the critically defocused image from the optic axis to the ray from the top of the object intersecting the optic axis at the center of the lens.

Referring to FIG. 2, at the center plane of the lens is an aperture whose radius, as measured from the optic axis perpendicularly downward in the plane of the cross-section shown, is R. The intensity of the light forming the image at a distance $x_2$ from the lens is approximately proportional to the intensity of the light coming from the object.

The attenuation depends on the magnification and the area of the aperture but is essentially independent of the shape of the aperture. The intensity of light at the critically defocused image is directly proportional to the convolution of the intensity at the object and the aperture transmittance. If the unknown representation is displayed as a relatively light object against a relatively dark background and the aperture has the same shape as the unknown representation, then the peak intensity of the critically defocused image will be greater, or at least as great, as the peak intensity obtained with any other possible reference representation. Similarly if the unknown representation is darker than its background, then the minimum intensity of the critically defocused image will be least when the aperture has the same shape as the reference representation. Thus, whether the unknown representation is lighter or darker than its background, it can be identified by placing several different possible reference representations in the plane of the lens and comparing the maximum intensity of the output or the minimum intensity of the output. In both cases, the output is considered as the intensity of the critically defocused image. In order that this comparison process be accomplished in the shortest possible period of time, it is desirable that a complete set of reference representations be referred simultaneously to the unknown representation. Such a comparison may be accomplished by placing the complete set of reference representations in a region coplanar with and bounded by the lens. Individual critically defocused images are obtained in correspondence with individual reference representations. Individual photodetectors are so placed as to detect the peak intensities of these individual critically defocused images in order to determine the reference representation corresponding to the unknown representation.

In a typical embodiment of the system of FIG. 2: $y_1$, R, $f$ and $r_1$ are known; $y_1$ depends on the size of the unknown representation; R depends on the size of the reference representation; $f$ is the focal length of the lens; and $r_1$ depends on the spacing required between adjacent photodetectors. With these quantities known, Equations I may be solved to give $y_2$, $x_1$, $x_2$ and $d_1$ explicitly as follows:

$$\left.\begin{aligned} y_2&=\frac{Rr_1}{R-r_1} \\ x_1&=\left[1+\frac{y_1}{r_1}\,\frac{R-r_1}{R}\right]f \\ x_2&=\left[1+\frac{r_1}{y_1}\,\frac{R}{R-r_1}\right]f \\ d_1&=\left[\frac{r_1}{y_1}+\frac{R-r_1}{R}\right]f \end{aligned}\right\}\text{Equations II}$$

In the specific case where $R=y_1$, it follows that:

$$\left.\begin{aligned} y_2&=\frac{Rr_1}{R-r_1} \\ x_1&=\frac{R}{r_1}f \\ x_2&=\frac{R}{R-r_1}f \\ d_1&=f \end{aligned}\right\}\text{Equations III}$$

*The Optical System of FIG. 3*

As indicated above, there are two critically defocused images, one between the lens and the in-focus image and the other at the far side of the in-focus image. These critically defocused images differ in scale. Also, the latter is proportional to the convolution of the brightness of the object with the transmittance of the inverted aperture. Thus, in the latter case, each reference representation must be inverted relative to the unknown representation in order to be used with this system.

The optical system of FIG. 3 may be described by the following equations:

$$\left.\begin{aligned} &\frac{1}{x_1}+\frac{1}{x_2}=\frac{1}{f} \\ &\frac{R}{x_2+d_2}=\frac{y_2}{d_2} \\ &\frac{r_2}{x_2+d_2}=\frac{y_2}{x_2} \\ &\frac{x_1}{x_2}=\frac{y_1}{y_2} \end{aligned}\right\}\text{Equations IV}$$

where:

$y_1$, $y_2$, $x_1$, $x_2$ and $f$ are defined as in the case of Equations I;

R is the effective radius of the lens in the cross-section shown (it is to be understood that since the aperture is not circularly symmetrical, the radius may be different in every direction);

$d_2$ is the distance measured along the optic axis from the in-focus image to the point on the optic axis crossed by a ray from the top of the object through the lowest point on the periphery of the stop in the lens plane;

$x_2+d_2$ is the distance from the lens to the critically defocused image; and $r_2$ is the distance measured in the plane of the second critically defocused image from the optic axis to a ray coming from the top of the object and crossing the optic axis at the center of lens.

In the case where $y_1$, R, $f$ and $r_2$ are known, Equations IV may be solved to give $y_2$, $x_1$, $x_2$ and $d_2$ explicitly as follows:

$$\left.\begin{aligned} d_2&=\left[\frac{r_2}{R}+\frac{r_2^2}{y_1(R+r_2)}\right]f \\ x_1&=\left[1+\frac{y_1(R+r_2)}{Rr_2}\right]f \\ x_2&=\left[1+\frac{Rr_2}{y_1(R+r_2)}\right]f \\ y_2&=\frac{Rr_2}{R+r_2} \end{aligned}\right\}\text{Equations V}$$

It will be noted from FIG. 3 that the second critically defocused image does not exist if $y_2 \geq R$.

*The Optical System of FIG. 4*

In the optical system of FIG. 4, if the height of the object is $2c$ and the height of the aperture is $2d$, where $d<c$, then whenever the unknown representation and the aperture are in parallel planes a distance $a$ apart, then at a distance $b$ beyond the aperture, there will be a defocused image whose intensity is proportional to the convolution of the reference representation with the aperture transmittance. The relative size of $a$ and $b$ may be determined as from the following equation:

$$\frac{a+b}{b}=\frac{c}{d} \text{ Equation VI}$$

As in the case of the optical systems of FIGS. 2 and 3, it is assumed that the object is uniformly illuminated and is a diffuse radiator or a diffuse reflector or is transmitting properly diffused light so that every point of the aperture will receive equal amounts of light. The plane spaced at a distance $b$ to the right of the aperture in FIG. 4 may be called the critically defocused image plane as in the case of the other optical systems. If this system is to work, as in the case of the system of FIG. 3, each aperture must be smaller than the unknown representation. An advantage of the system of FIG. 4 is that no lens is required. Thus, lens aberrations have no effect on the critically defocused image.

*Further Considerations*

Although FIGS. 2 and 3 show optical systems involving only a single thin lens element, it is to be understood that more complex lens systems may be designed to accomplish the same purpose but reducing aberrations including chromatic aberrations when monochromatic light is not used. When the unknown representation is viewed by reflected light, naturally some means of uniform illumination of the unknown representation must be provided. There are many commercially available light sources capable of performing this function.

When an unknown representation is viewed by transmitted light, the following problem arises. In order that the aperture receive equal illumination from every point of the unknown representation, it is necessary that rays from the light source illuminate the unknown representation uniformly and continue in straight paths through the reference apertures. These conditions are accomplished by using a uniform light source, for example, a ribbon filament rather than a coiled filament. Alternatively, a diffuser such as a ground glass plate is placed somewhere in the optical system to achieve the effect of a uniformly diffuse light flux. Alternatively, the light is supplied from a small hole in an integrating sphere.

An unknown representation may be viewed by transmitted light, reflected light or light radiated by the unknown representation or its background. However, the system shown in FIG. 4 is often the most desirable because the critically defocused image most accurately constitutes a convolution when the effect of lens aberration is removed. When it is desired that unknown characters be recognized at a relatively slow rate, it is often preferred to modulate the light source as by mechanical chopping rather than to operate the photodetectors and associated electronic equipment at low frequencies.

When the symbol to be recognized is represented as a variation in transmittance as, for example, when displayed on a photographic transparency, any of the optical systems shown in FIGURES 2, 3 and 4 may be used as discussed above. However, there are three additional possibilities. The positions of the reference representations and the unknown representation may be interchanged in each of the three systems.

The foregoing provides a simple system for identifying an unknown representation by comparing it simultaneously with an array or font of reference representations. However, problems may arise where a uniform field is substituted for a proper representation or where the unknown representation not only corresponds to a first representation but also is included as part of a second representation. In the former case, peak intensities associated with all representations of the array may be maximized. In the latter case, the peak intensities resulting from comparisons with the first and second reference representations may be equal. One technique for eliminating this type of error, is to employ two optical channels and electronic subtraction in order to permit positive and negative weightings of the averaging neighborhood. At any rate, whether one or two optical channels are employed for each character, the reference representations need not be identical to the corresponding unknown representations but preferably are altered where desirable in order to emphasize dissimilarities among the reference representations and to suppress similarities.

If the reference representation of a given character $C_i$ as a transparent region on an opaque background produces a corresponding photodetector output $P_i$ and the reference representation of $C_i$ as an opaque character on a transparent background has a corresponding photodetector output $N_i$, then the algebraic sum $R_i=P_i+N_i$ is equal to the photodetector output that would be produced with a reference representation transparent everywhere in the field of view. Since the field of view is the same for every character and $N_i=R_i-P_i$, it follows that only one representation is needed for each character, namely a transparent character on an opaque background. A single auxiliary aperture having the shape of the field of view and a size in proportion to the reference representations of the various characters is then used. Instead of measuring $P_i-N_i$ each comparator may measure the corresponding $2P_i-R_i=P_i-N_i$. This assumes that the same amount of horizontal space is allowed for each unknown representation. An example of this would be typewritten character where the center-to-center spacing is the same for any two adjacent characters on the same line. If the horizontal spaces allowed for each unknown representation are not equal, as is the case with most linotype printing, then a separate auxiliary aperture is needed for each different field of view.

Figure 5:
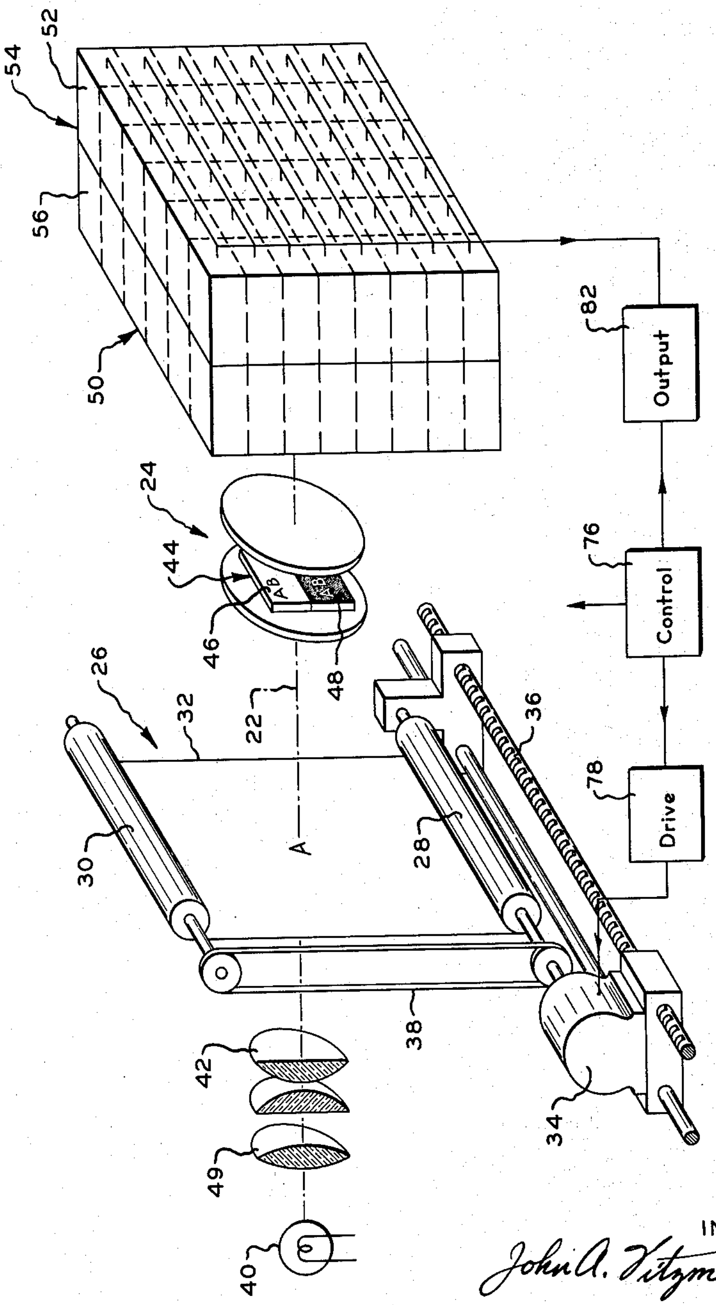
FIG. 5 illustrates an embodiment of the present invention, partly in mechanical perspective and partly in electrical block diagram.
Figure 6:
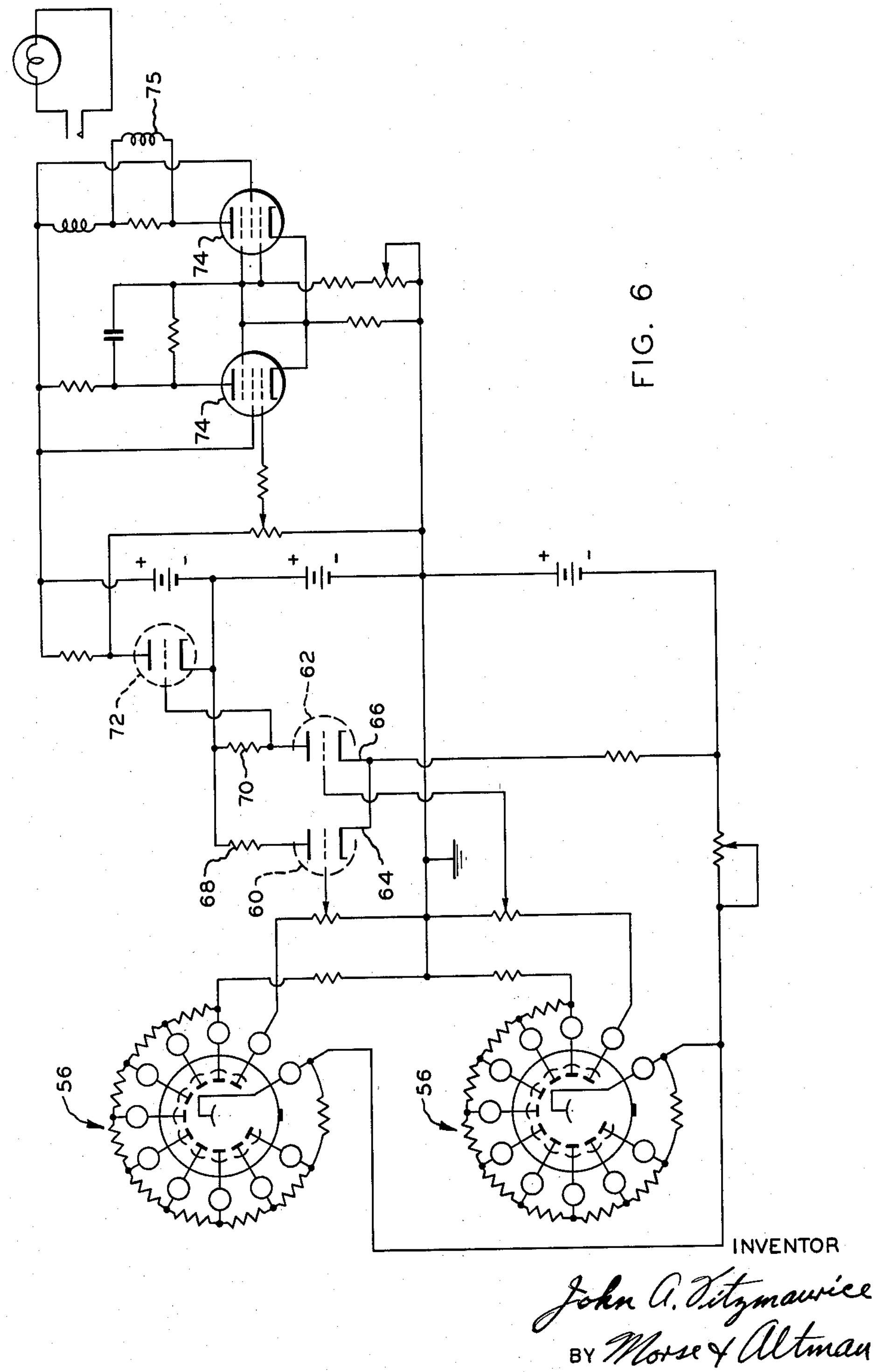
FIG. 6 is a schematic diagram of a component of the electrical system of the device of FIG. 5.

*The Mechanical and Electrical System of FIGS. 5 and 6*

The specific embodiment of the present invention, shown in FIGS. 5 and 6, comprises a lens system 24 presenting an object region, a center region, an image region and an out-of-focus region disposed in parallel along an axis 22 in the manner shown in FIG. 1 at 12, 16, 14 and 20, respectively. In the object region is a holder 26 including a supply spool 28 and a take-up spool 30 between which an elongated photographic transparency 32 extends. Transparency 32 is shown as carrying alphanumeric characters for transformation at axis 22 one-by-one into distinctive electrical signals. Holder 26 includes: a drive 34 having a ratchet component coacting with horizontal notched guide rods 36 for stepping successive increments of a row of transparency 32 into alignment with axis 22; and a ratchet component for coacting with chain and sprockets 38 for stepping successive rows of transparency 32 into alignment with axis 22. A source of illumination 40 and a condensing lens system 42 are designed to illuminate a single alphanumeric character aligned at any given time with axis 22. At the optical center of lens system 24 is an array 44 presenting all characters of a font containing all possible unknown characters appearing on photographic transparency 32. The ground glass 49 is imaged by the lens system 42 into an unrecognized character on the transparency 32. Alternatively, a ribbon filament is imaged directly on the unrecognized character. In either embodiment, both the unrecognized character representation on transparency 32 and the reference array 44 are uniformly illuminated. Array 44 presents both positive and negative representations of each character, positive representations being shown at 46 as being light upon a dark background and negative representations being shown at 48 as being dark upon a light background. Spaced at an optimum out-of-focus distance from the image plane of lens system 24 is an array 50 of photocells 56. The characters 46 and 48 of array 44 and the photocells of array 50 are so arranged that rays of light through a particular character of photographic transparency 32 are transmitted through each of the characters appearing on array 44 to a corresponding photocell of array 50. The two signals of a pair of corresponding rays through a pair of characters of positive group 46 and negative group 48 are compared in comparators 52 of an array 54.

Each of comparators 52, as shown in FIG. 6, is in the form of a difference amplitude discriminator operating in response to a pair of photodetectors 56 such as the photomultipliers of array 50. The output pulses from photodetectors 56 are applied to the control grids of a pair of triode stages 60 and 62 having a common cathode 64, 66 and plate resistors 68, 70 through which the plate polarizing potential is applied. A subtracting triode stage 72 operates with its cathode at the plate polarizing potential of stages 60 and 62 having a common cathode 64, 66 and plate resistors 68, 70 through which the plate polarizing potential is applied. A subtracting triode stage 72 operates with its cathode at the plate polarizing potential of stages 60 and 62. The difference voltage, taken from across the plate resistor of stage 62, is applied to a two-stage power amplifier 74, which is capable of energizing an electromagnetic switch 75 if the difference signal is sufficiently great. The overall system is so designed that only one such switch will be actuated in response to the positioning of a given unknown character on axis 22.

In operation, the system is designed to operate in response to a metering control 76 which synchronizes the operation of a drive control 78 and an output circuit 82. The recognition speed of the aforementioned device may be very high because no scanning is required. As the entire unknown character is compared simultaneously with every reference character, the operating time is independent of the number and complexity of the reference characters. Consequently, the recognition speed is limited primarily by the rate at which characters can be moved past the reading station.

It is to be understood that Equations I, II, III, IV, V and VI are rigorously descriptive of thin lens systems and approximately descriptive of corresponding thick lens, multiple lens and compound lens counterparts.

Since certain changes may be made in the above devices without departing from the scope of the invention herein involved, it is intended that all matter contained in the above description or shown in the accompanying drawings shall be interpreted in an illustrative and not a limiting sense.

What is claimed is:

1. An electro-optical device for identifying an unknown visual representation, said device comprising focusing means defining an optic axis, a center plane at said focusing means, an object plane at one of a pair of foci of said focusing means, an image plane at the other of said pair of foci of said focusing means and a critically defocused plane spaced from said image plane, means for positioning said unknown visual representation in association with one of said object plane and said center plane, means including and positioning an array of known representations in association with the other of said object plane and said center plane, means including and positioning an array of detecting means in association with said critically defocused plane, and means for illuminating said unknown visual representation substantially in its entirety at any given time, a selected proportion of illumination from said unknown visual representation being directed to one each of said known representations and to one each of said detecting means, said object plane, said center plane, said image plane and said critically defocused plane being positioned such that; to a design approximation:

$$\frac{1}{x_1}+\frac{1}{x_2}=\frac{1}{f}$$

$$\frac{x_1}{x_2}=\frac{y_1}{y_2}$$

$$\frac{R}{d_1}=\frac{y_2}{x_2 d_1}$$

$$\frac{r_1}{d_1}=\frac{y_1}{x_1}$$

where:

$y_1$ is the perpendicular distance from the optic axis to the extreme point in the object plane farthest from the optic axis;

$y_2$ is the corresponding image size in the image plane;

$x_1$ is the distance from the object plane to the center plane as measured along the optic axis;

$x_2$ is the distance from the center plane to the image plane as measured along the optic axis;

$f$ is the focal length of the focusing means;

R is the effective radius of the focusing means;

$d_1$ is the distance measured along the optic axis from the center plane to the point where a ray, coming from the extreme point in the object plane and transmitted from the focusing means at a distance R from the optic axis, intersects the optic axis; and $r_1$ is the distance measured in the critically defocused plane of the optic axis to the ray from the extreme point in the object plane intersecting the optic axis at the center plane.

2. An electro-optical device for identifying an unknown visual representation, said device comprising focusing means defining an optic axis, a center plane at said focusing means, an object plane at one of a pair of foci of said focusing means, an image plane at the other of said pair of foci of said focusing means and a critically defocused plane spaced from said image plane, means for positioning said unknown visual representation in association with one of said object plane and said center plane, means including and positioning an array of known representations in association with the other of said object plane and said center plane, means including and positioning an array of detecting means in association with said critically defocused plane, and means for illuminating unknown visual representation substantially in its entirety at any given time, a selected proportion of illumination from said unknown visual representation being directed to one each of said known representations and to one each of said detecting means, said object plane, said center plane, said image plane and said critically defocused plane being positioned such that, to a design approximation:

$$\frac{1}{x}+\frac{1}{x_2}=\frac{1}{f}$$

$$\frac{R}{x_2+d_2}=\frac{y_2}{d_2}$$

$$\frac{r_2}{x_2+d_2}=\frac{y_2}{x_2}$$

$$\frac{x_1}{x_2}=\frac{y_1}{y_2}$$

where:

$y_1$ is the perpendicular distance from the optic axis to the extreme point in the object plane from the optic axis;

$y_2$ is the corresponding image size in the image plane;

$x_1$ is the distance from the object to the center plane as measured along the optic axis;

$x_2$ is the distance from the center plane to the image plane as measured along the optic axis;

$f$ is the focal length of the focusing means;

R is the effective radius of the focusing means;

$d_2$ is the distance measured along the optic axis from the image plane to the point on the optic axis crossed by a ray from the extreme point of the object plane through the corresponding point in the center plane;

$x_2+d_2$ is the distance from the focusing means to the critically defocused plane; and $r_2$ is the distance measured in the critically defocused image plane from the optic axis to a ray coming from the extreme point of the object plane and crossing the optic axis at the center plane.

3. An electro-optical device for identifying an unknown visual representation, said device comprising focusing means defining an optic axis, a focusing plane at said focusing means, an object plane at one of a pair of foci of said focusing means, an image plane at the other of said pair of foci of said focusing means and a critically defocused plane spaced from said image plane, means for positioning said unknown visual representation in association with one of said object plane and said focusing plane, means including and positioning an array of known representations in association with the other of said object plane and said focusing plane, means including and positioning an array of detecting means in association with said critically defocused plane, and means for illuminating said unknown visual representation substantially in its entirety at any given time, a selected proportion of illumination from said unknown visual representation being directed to one each of said known representations and to one each of said detecting means, said object plane, said focusing plane, said image plane and said critically defocused plane being positioned such that, to a design approximation:

$$\frac{a+b}{b}=\frac{c}{d}$$

where:

$2c$ is the extent of the object in the object plane;

$2d$ is the extent of the stop of the focusing plane;

$d$ is less than $c$; and $b$ is the distance between the focusing plane and the critically defocused plane.

References Cited in the file of this patent

UNITED STATES PATENTS

| | | |
|---|---|---|
| 2,088,297 | Koenig | July 27, 1937 |
| 2,115,563 | Tauschek | Apr. 26, 1938 |
| 2,432,123 | Potter | Dec. 9, 1947 |
| 2,594,358 | Shaw | Apr. 29, 1952 |
| 2,757,865 | Toulon | Aug. 7, 1956 |
| 2,787,188 | Berger | Apr. 2, 1957 |
| 2,933,246 | Rabinow | Apr. 19, 1960 |
| 2,936,607 | Nielsen | May 17, 1960 |
| 2,937,283 | Oliver | May 17, 1960 |

FOREIGN PATENTS

| | | |
|---|---|---|
| 470,638 | Great Britain | Aug. 17, 1937 |
| 324,238 | Switzerland | Oct. 31, 1957 |

OTHER REFERENCES

Born and Wolf: Principles of Optics, N.Y., Pergamon Press, 1959, pp. 453–457 and 511–514.